United States Patent [19]

Faville

[11] 4,417,147
[45] Nov. 22, 1983

[54] METHOD AND APPARATUS FOR MEASURING RUNOUT IN A CYLINDRICAL OBJECT

[75] Inventor: Paul E. Faville, Renton, Wash.

[73] Assignee: The Boeing Company, Seattle, Wash.

[21] Appl. No.: 238,854

[22] Filed: Feb. 27, 1981

[51] Int. Cl.³ .......................................... G01N 21/86
[52] U.S. Cl. ..................................... 250/560; 356/376
[58] Field of Search ....................... 250/560, 561, 224; 356/375, 376, 377, 384–387

[56] References Cited

U.S. PATENT DOCUMENTS

| 3,308,302 | 3/1967 | Fuhrmann et al. | 250/224 |
| 3,529,169 | 9/1970 | Heaney et al. | 250/224 |
| 3,544,796 | 12/1970 | Baker | 250/224 |
| 3,604,940 | 9/1971 | Matthews | 250/560 |
| 3,922,094 | 11/1975 | Colding et al. | 250/560 |

Primary Examiner—David C. Nelms
Attorney, Agent, or Firm—Christensen, O'Connor, Johnson & Kindness

[57] ABSTRACT

In a method and apparatus for determining runout in a cylindrical object, particularly a cutting or boring tool such as a drill bit or reamer, the object is rotated and a collimated beam of light is directed transversely at the rotating object so as to cast a shadow on a photosensor which produces an electrical signal having a current level representative of the area illuminated. Runout in the cylindrical object is manifested as a reciprocal variation in the area of the shadow cast on the photosensor, with a resulting periodic variation in the the output signal of the photosensor. The amplitude of this variation is determined to provide a measure of the total indicated runout of the object. In the preferred embodiment, a pair of photocells is positioned behind the rotating object and a differential amplifier and low-pass electronic filter are employed in series to separate variable signal components arising from runout from variable signal components due to profile variations in the object, for example, flutes in a twist drill.

10 Claims, 4 Drawing Figures

METHOD AND APPARATUS FOR MEASURING RUNOUT IN A CYLINDRICAL OBJECT

BACKGROUND OF THE INVENTION

The present invention relates generally to methods and apparatus for measuring runout in cylindrical objects, particularly cutting and boring tools such as drills and reamers.

Runout is a common defect in cutting and boring tools, such as drill bits and reamers, that consists of a bend or curvature in the longitudinal axis of the tool. Runout most commonly develops through use of the tool, although it also occurs occasionally as a manufacturing defect in a new tool. The usual consequence of runout is that the cutting tip of the tool, rather than rotating about its longitudinal axis, orbits in a small circular path about the true axis of rotation of the shank of the tool and that of the machine in which the tool is held. The actual diameter of the circle through which the tip of the tool orbits while so held is the measure of the tool runout, and is referred to in the art as the "total indicated runout".

Heretofore, the manual detection and measurement of runout in cutting tools has been a relatively slow and painstaking process, with the measured runout being subject to substantial individual variation from one machinist to another. There has not been available previously an apparatus for providing a rapid and reliable measurement of runout and which is also suitable for efficiently processing large numbers of tools. There has been a need for such an apparatus, for example, in the aircraft industry where large numbers of closetolerance drill bits are used on a daily basis in precision drilling and riveting production operations.

Accordingly, it is the general object and purpose of the present invention to provide a method and apparatus for detecting and measuring runout in a cylindrical object, particularly a cutting tool such as a drill bit or a reamer. It is a further object to provide a method and apparatus for measuring runout that is rapid, accurate, and independent of the particular operator performing the task.

SUMMARY OF THE INVENTION

The present invention provides a method and apparatus for measuring runout in any elongated, generally cylindrical object, although for purposes of description the invention will be described below with particular reference to boring and cutting tools such as drills and reamers.

In accordance with the invention, a tool to be inspected for runout is held at its shank end and rotated with the cutting end positioned between a source of a beam of light and a photosensor comprising one or more photocells. In accordance with well known characteristics of certain types of semiconductor photocells, the current of the photocell output signal varies with the area of the photocell illuminated. The photocell is positioned so as to be partially illuminated by a portion of the light beam passing on one side of the rotating tool and partially shadowed by the tool. Rotation of a tool with runout results in a reciprocating shadow boundary on the face of the photocell that gives rise to a periodic variation in the current of the photocell output signal. If the tool is perfectly cylindrical and free of runout, the illuminated area of the photocell is invariable and the output current is invariable. Runout in the tool is manifested by a generally sinusoidal variation in the area of the illuminated portion of the photocell, and hence also a sinusoidal variation in the level of the output current, which variations each occur at precisely the frequency of rotation of the tool. Further, the amplitude of the variation in the output signal is generally proportional to the absolute magnitude of the runout in the tool, and may therefore be directly measured and, with appropriate calibration, used to provide a direct indication of the total indicated runout in the tool.

Ordinarily, however, the tool is not perfectly cylindrical and includes features that give rise to periodic design profile variations as the tool is turned. Such profile variations give rise to additional periodic variations in the illuminated area and hence also additional variations in the output signal of the photocell. Such variations are superimposed on any variation due to runout. For example, the flutes of a typical twist drill give rise to a periodic variation in the illuminated area of the photocell as the drill is turned. However, since there are typically two or more flutes in a twist drill, and multiple cutting edges in the case of a reamer, the time-varying components of the photocell signal from these sources, referred to generally as flute components of the signal, occur at higher frequencies than the time-varying component due to runout. Accordingly, it is found that the runout component of the photocell signal may be separated from the flute components by electronic filtering, with the operating frequency of the filtering being determined by the rotational frequency of the tool to isolate the runout component of the signal.

Preferably, the apparatus utilizes two matched photocells spaced from one another and symmetrically positioned about the centerline of the tool so as to lie under the opposite edges of the shadow cast by the tool. The wobble of the tool due to runout thus results in variations in the photocell signals that are of substantially equal magnitude, but which are out of phase with one another by 180 degrees. The advantage of this arrangement is that, in the typical case of a twist drill having two flutes, or in the case of any other tool having an even number of symmetrically disposed cutting edges, the flute components of the two photocell signals are in phase with one another and can therefore be further separated from the out-of-phase runout components by combining the photocell signals in a differential amplifier. In one preferred embodiment of the invention, which is primarily adapted to measuring runout in twoflute twist drills, both a differential amplifier and a lowpass filter are employed in series to optimally separate the runout components from the flute components of the photocell signals.

In one preferred embodiment of the invention, the tool is held and rotated in a rotary V-block, which is preferred over a conventional drill chuck because of its accuracy and repeatability in centering tools of various diameters between the light source and the photocell. With a rotary V-block, however, the rotational speed of the tool depends on the diameter of the tool. In this embodiment of the invention, therefore, the operating frequency of the low-pass filter is held constant, and a variable-speed motor is employed to drive the rotary V-block at the speed necessary to obtain a predetermined, constant tool speed. In this embodiment, a digital readout of the actual rotational speed of the tool is obtained by applying the photocell signals to a summing amplifier and a bandpass filter that isolates the in-phase flute components of the photocell signals and converts them to a square wave which is applied to a frequency counter. The frequency counter provides a digital output of the rotational speed of the tool, such that the operator may vary the speed of the drive motor until the desired rotational speed of the tool is obtained.

In another preferred embodiment, a voltage-controlled, variable frequency filter is employed to enable the measurement of runout in tools turning at variable rotational speeds. The advantage of this embodiment is that the runout, for example, of a cutting tool of a vertical mill, may be measured in the field while turning it at its standard operating speed, without removing the tool from the mill. The runout measuring apparatus tracks the speed of the turning tool and varies the cutoff frequency of the filter as required to separate the runout components from the flute components of the photocell signals.

These and other aspects and advantages of the present invention will be more apparent with reference to the accompanying FIGURES and the following detailed description of the preferred embodiment.

DETAILED DESCRIPTION OF THE PREFERRED EMBODIMENT

Figure 1:
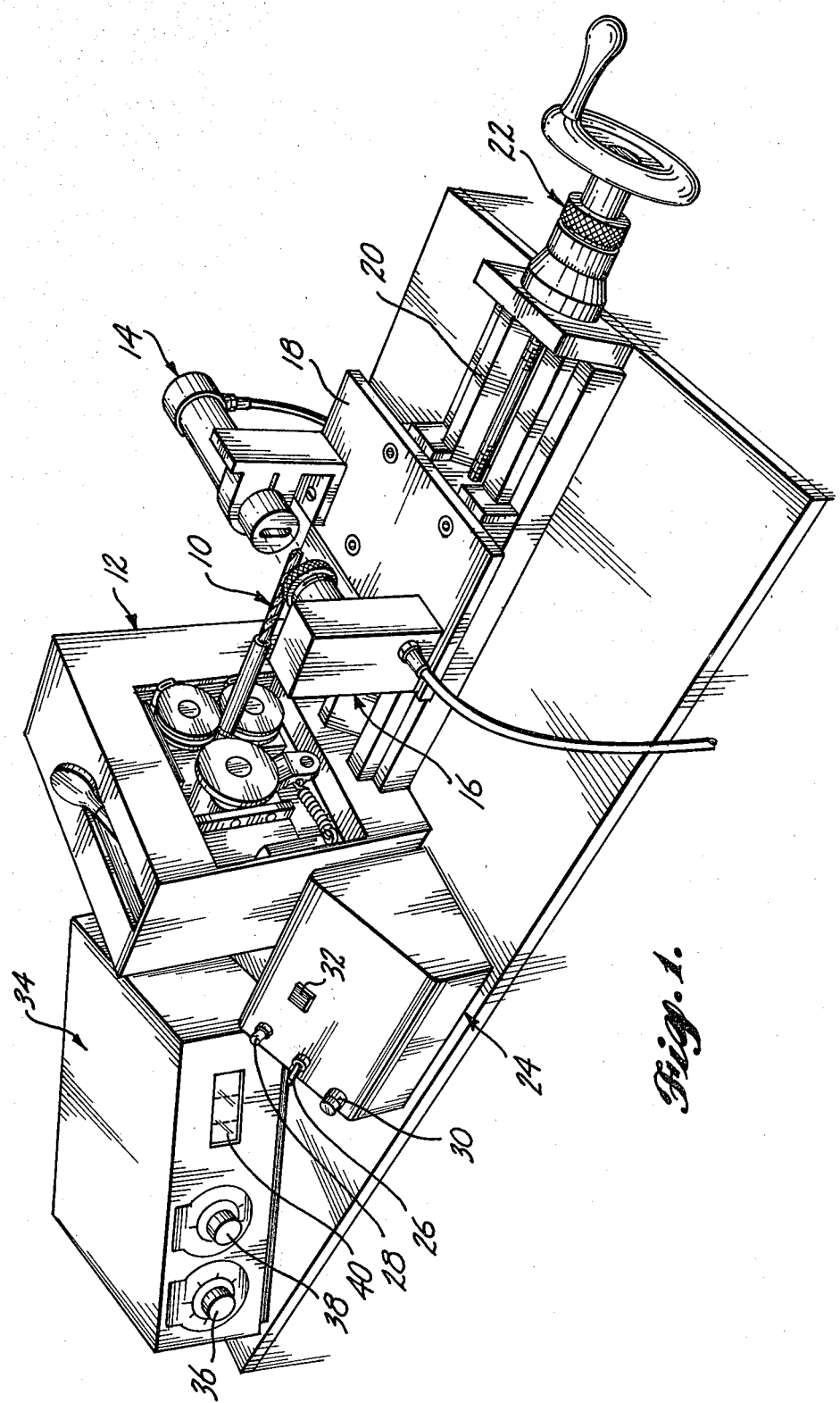
FIG. 1 is a pictorial view of a preferred embodiment of the runout measurement apparatus of the present invention.

Referring to FIG. 1, a preferred embodiment of the present invention is illustrated as a tabletop apparatus for detecting and measuring the total indicated runout in a cutting tool, particularly a conventional dual-fluted twist drill 10. The twist drill 10 is mounted horizontally in an electrically powered, variable-speed rotary V-block 12. A light source 14 directs a collimated beam of light transversely across the rotating twist drill 10 toward a photosensor module 16. The light source 14 and the photosensor module 16 are mounted on a platform 18 supported by an optical bench 20 extending parallel to the drill 10. The position of the platform 18 along the optical bench 20 may be varied by means of a line screw 22 to accommodate twist drills 10 of different lengths or to measure runout at different points along a particular drill. Ordinarily, runout is measured at or near the tip of a cutting tool such as the drill 10 illustrated in FIG. 1.

Other elements illustrated in FIG. 1 are a circuit box 24, including a main power ON/OFF switch 26 for the rotary V-block 12, an associated power indicator light 28, power circuit fuse 30, and motor start switch 32. A motor control unit 34 includes coarse and fine motor speed controls 36 and 38, respectively, and a digital motor speed readout 40. Not shown in FIG. 1 is the digital voltmeter and associated circuitry that provides a readout of the runout in the drill 10.

Figure 2:
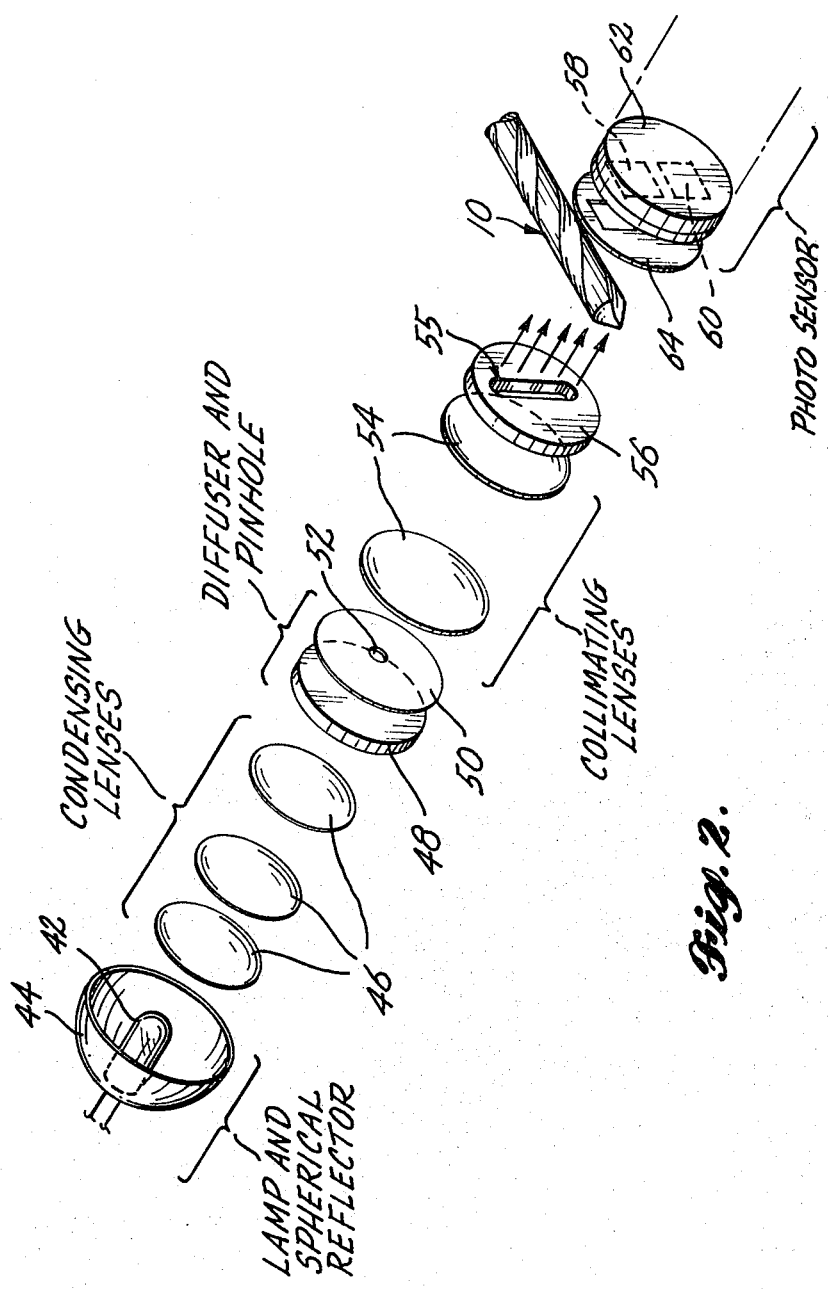
FIG. 2 is a schematic exploded diagram of the optics of the apparatus of FIG. 1.

Referring to FIG. 2, the light source 14 in the preferred embodiment includes a ten-watt halogen lamp 42 and associated spherical reflector 44. Light from the lamp 42 is focused by a set of condensing lenses 46 onto a frosted glass diffusion plate 48 positioned adjacent an opaque plate 50 having a pinhole aperture 52. The frosted plate 48 and the pinhole aperture 52 act as a point source of light. Light from the pinhole 52 is refracted by a pair of collimating lenses 54 to provide a collimated beam of light. The collimated beam is passed through a vertical slot 55 in an opaque exit plate 56 and directed orthogonally at the rotating twist drill 10 so as to pass the drill on both sides.

Figure 3:
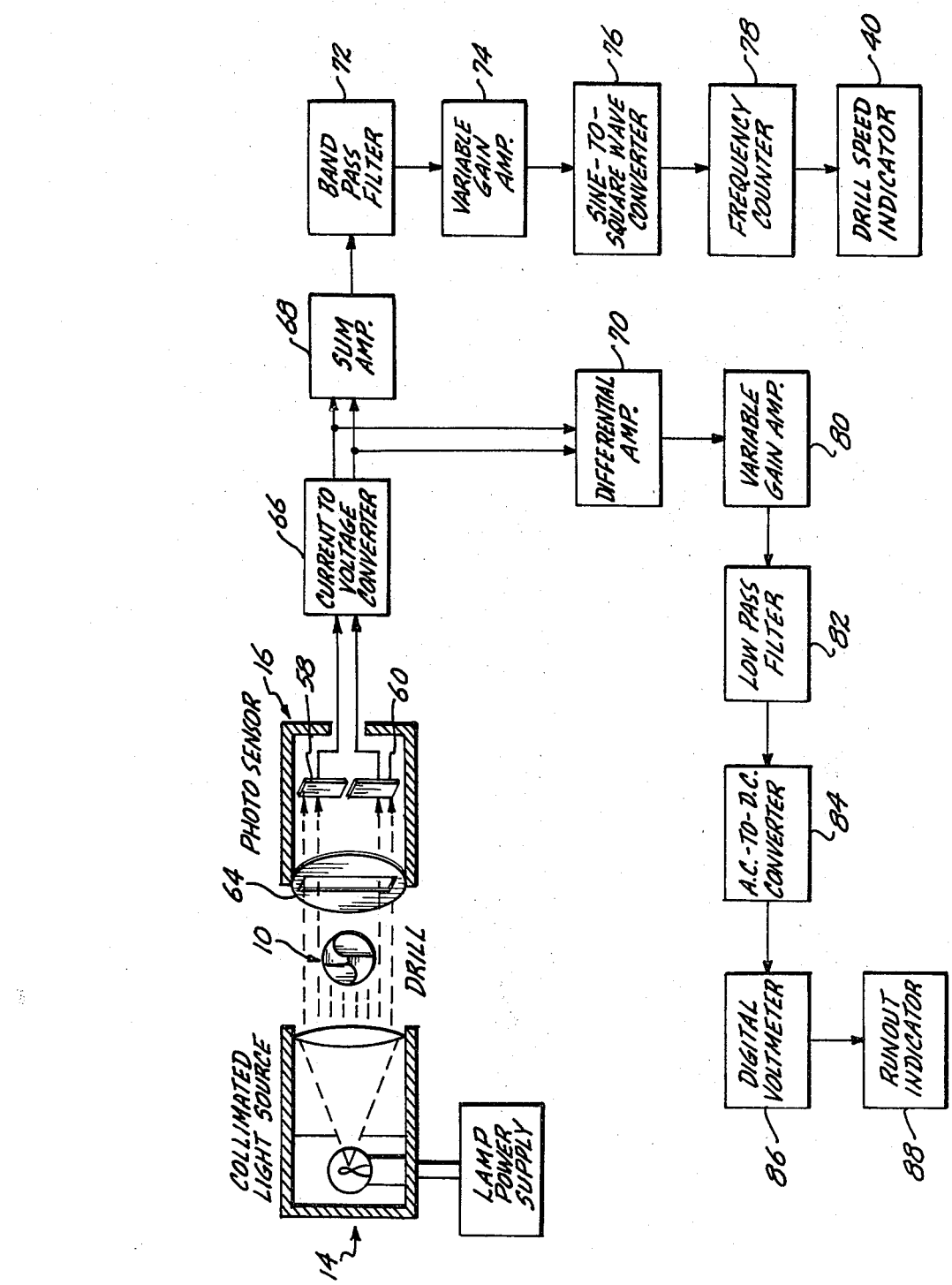
FIG. 3 is a functional block diagram of the apparatus illustrated in FIG. 1.

Referring to FIGS. 2 and 3, a portion of the light beam passes on opposite sides of the drill 10 to impinge on two matched PN silicon photocells 58 and 60 mounted on a single insulating wafer 62. The photocells 58 and 60, each approximately 5 mm wide by 10 mm long, are separated by a gap approximately 0.25 mm wide that is oriented parallel to and centered on the drill 10 opposite the light source, such that the photocells 58 and 60 are equally shadowed by the drill 10. The photocells 58 and 60 are matched with one another to have substantially identical output characteristics. Additionally, the photocells are each selected to have a variation in output of not greater than five percent when scanned linearly over the active surface area with a light beam passed through a 0.007-inch wide slot. Suitable photocells are commercially available, for example, from Silicon Sensor, Inc., of Dodgeville, Wisconsin.

The energy level of the collimated beam that illuminates the photocells 58 and 60 is, in the preferred embodiment, about 600 microwatts/cm$^2$. With this level of illumination, the output of each photocell is about 0.06 microamp per thousandth of an inch of illumination along the lengthwise axis of the photocell. In FIG. 3, the crosshatched areas of the photocells 58 and 60 illustrate schematically the portions of the photocells 58 and 60 shadowed by the drill 10 in position for runout measurement. A slotted opaque disc 64 is located at the front of the photosensor module 16 to minimize entry of ambient light and define the illuminated areas of the photocells 58 and 60.

The operation of the apparatus is illustrated functionally in FIG. 3. Briefly, the two photocells 58 and 60 each produce an output signal that is of relatively constant voltage, on the order of 0.45 volt DC, and which varies in current in proportion to he area of the photocell that is illuminated. The photocell output signals are applied to a dual channel current-to-voltage converter 66. The current-to-voltage converter 66 is preferably an operational amplifier-type converter to minimize the load drawn from the photocells and thereby obtain substantially linear photocell responses. The converted photocell signals are applied to each of a summing amplifier 68 and a differential amplifier 70, which are the first elements in a drill speed indicator circuit and a runout indicator circuit, respectively.

Briefly, in the drill speed indicator circuit the summed signal from amplifier 68 is passed in sequence through a bandpass filter 72, a variable-gain amplifier 74, and a sine-to-square wave converter 76. The squared signal from the square wave converter 76 is applied to a frequency counter 78. The frequency counter 78 is adapted to provide an output corresponding to to the actual drill speed, in rpm, to the drill speed indicator 40.

In the runout indicator circuit, the parallel outputs of the current-to-voltage converter 66 are applied to the differential amplifier 70 and the output thereof is applied to a variable-gain amplifier 80 that is employed to calibrate the apparatus. The output from the variable-gain amplifier 80 is passed through a low-pass filter 82 to an AC-to-DC converter 84. The DC output of the converter 84 is measured with a digital voltmeter 86 and provided to a digital runout indicator 88.

The embodiment thus far described and illustrated in FIG. 3 is particularly adapted to the measurement of runout in, for example, a two-fluted twist drill. In operation, the drill is initially rotated in the rotary V-block 12 at approximately 300 rpm. The actual speed varies somewhat with the diameter of the drill 10. Variations in the output signals from the photocells 58 and 60 due to design profile variations in the drill, that is, due to the flutes in the drill, are in phase with one another and are therefore additively combined in the summing amplifier 68. Runout components of the signals, which are out of phase, are approximately cancelled in the summing amplifier 68. The summing amplifier thus serves to remove the runout components from the flute comonents of the photocell signals.

The filter 72 is preferably a state variable bandpass filter having a Q value of approximately 10. The bandpass filter 72 operates in addition to the summing amplifier 68 to further remove runout components from the photocell signals. For example, when runout is to be measured with the drill turning at 300 rpm, the bandpass filter 72 is selected to have a center frequency of approximately 10 Hz, or twice the rotational frequency of the drill 10. The flute components of the drill turning at 300 rpm have a frequency of approximately 10 Hz and are therefore passed through the bandpass filter 72, whereas lower frequency runout components are removed. The filtered flute components are applied through the variable-gain amplifier 74 and the sine-to-sqaure wave converter 76 to the frequency counter 78. The frequency counter 78 counts the output of an internal time base oscillator during each cycle of the approximately 10-Hz flute signal. With appropriate selection of the time base oscillator, the readout of the frequency counter 78 provides a direct indication of the actual drill rpm. In practice, the operator adjusts the speed of the rotary V-block 12 with the coarse and fine motor speed controls 36 and 38 (FIG. 1) until an rpm readout of 300 is obtained at the drill speed indicator 40.

Once the drill speed has been set at 300 rpm, the runout portion of the circuit is enabled to provide a direct reading of runout in the drill 10. Specifically, the differential amplifier 70 and the low-pass filter 82 each operate to pass runout components of the photocell signals and remove flute components. Flute components, being in phase with one another, are largely cancelled in the differential amplifier 70. Remaining flute components are removed by the low-pass filter 82, which is preferably based on a tenth-order, low-pass Butterworth active filter circuit having a unity gain and an operating frequency of approximately 5 Hz. The filter 82 is preferably adapted to provide approximately 36 db attenuation one octave above the operating frequency and approximately 60 db attenuation at three or more times the operating frequency. With the drill turning at 300 rpm, runout components have a frequency of 5 Hz and are therefore passed through the low-pass filter 82.

The output of the low-pass filter 82 is a 5-Hz sine wave signal having an amplitude proportional to the runout of the drill 10. This signal is applied to the AC-to-DC converter 84, which preferably consists of a digital peak detector that acquires and holds the maximum peak-to-peak voltage of the 5-Hz signal received from the filter 82. The advantage of using a peak detector is that, with a 5-Hz signal, a more rapid determination of the drill runout is obtained than can be obtained with other types of AC-to-DC converters, for example a rectifier. A suitable peak detector is available commercially from Daytronics Corporation of Dayton, Ohio, and is identified as a Model 9279 Max/Min Module.

The output of the Ac-to-DC converter 84 is a DC signal having a voltage proportional to the runout of the drill 10. The digital voltmeter 86 measures this voltage and provides a direct indication of the drill runout, in thousandths of an inch, at the digital runout indicator 88. In practice, the runout determination takes approximately two seconds after the drill 10 is brought up to speed.

Figure 4:
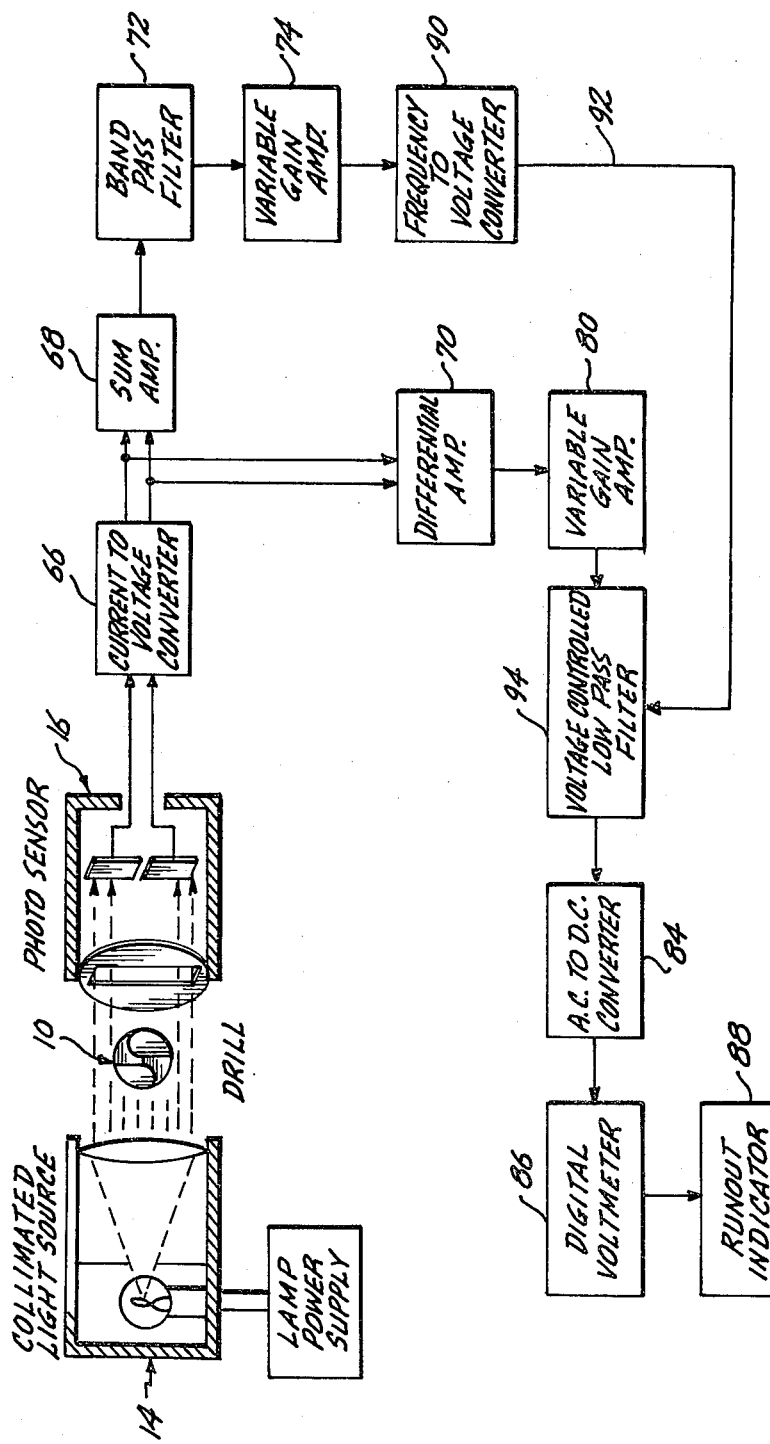
FIG. 4 is a functional block diagram of an alternative preferred embodiment of the invention.

FIG. 4 illustrates schematically in block diagram an alternative preferred embodiment of the invention that does not require the drill 10 to be rotated at a constant, predetermined speed. Elements of the embodiment of FIG. 4 that are substantially the same as elements of the embodiment of FIG. 3 are like numbered. The primary advantage of the embodiment of FIG. 4 is that it may be employed in the field to measure runout in cutting tools directly in their working environment. For example, the apparatus may be employed to measure runout in the cutting tool of a milling machine without having to remove the cutting tool from the machine. The embodiment makes use of a frequency-to-voltage converter 90 that receives as input the summed and filtered flute components of the photocell signals. As in the previous embodiment, the summing amplifier 68 and the bandpass filter 72 effectively remove runout components. The frequency-to-voltage converter 90 provides a variable voltage control signal on line 92 to a voltage-controlled, low-pass filter 94. The cutoff frequency of the low-pass filter 94 is thereby varied in response to the rotational speed of the drill 10. The remainder of the embodiment of FIG. 4 is essentially the same as the embodiment of FIG. 3. However, it will be appreciated that the method and apparatus represented by FIG. 4 can be more advantageously employed to measure runout in rotating tools or other objects where their removal for mounting in a rotary V-block or other device would be difficult or otherwise undesirable.

Although the present invention is described and illustrated with reference to preferred embodiments of the invention, it will be understood that modifications, substitutions, and alterations that may be apparent to one of ordinary skill in the art may be made without departing from the spirit of the invention. Accordingly, the scope of the invention is defined by the following claims.

The embodiments of the invention in which an exclusive property or privilege is claimed are defined as follows:

1. An apparatus for determining runout in an elongated, cylindrical object having $2n$ radially extending profile variations in the cross-sectional geometry thereof, wherein n is a predetermined integer, said apparatus comprising:
    drive means for holding an elongated, cylindrical object along a first portion of its length and rotating the object about the longitudinal axis of such first portion with a second portion of the length of said object extending therefrom, said drive means including means for rotating said object at a rate of R revolutions per second;
    radiation source means for directing at least one beam of radiant energy transversely toward said second portion of said object from a location spaced apart from one side thereof, said radiation source means being positioned to direct said radiant energy on said second portion of said object with a portion of said beam passing tangentially across each of the two longitudinally extending, oppositely disposed surface regions of said object;

first and second detectors positioned on the opposite side of said object from said radiation source means, said first detector being positioned for partial illumination by the portion of said beam passing across the first one of said two oppositely disposed surface regions of said object and being positioned for partial shadowing by said second portion of said cylindrical object throughout a complete revolution of said object, said second detector being positioned for partial illumination by the portion of said beam passing across the second one of said two oppositely disposed surfaces of said object and being positioned for partial shadowing by said second portion of said cylindrical object throughout a complete revolution of said object, said first and second detectors respectively supplying first and second electrical signals representative of the area of said first and second detector that is partially illuminated by said beam; and circuit means connected for receiving said first and second electrical signals produced by said first and second detectors, said circuit means including signal processing means for supplying a difference signal representative of the difference between said first and second signals supplied by said first and second detectors, said circuit means further including filter means connected for receiving said difference signal, said filter means for supplying a signal representative of the runout of said object, said filter means configured and arranged for passing an electrical signal having a frequency substantially equal to R and for substantially attenuating signals at a frequency of 2nR.

2. The apparatus defined in claim 1 wherein said first and second detectors comprise first and second photocells that are oriented substantially parallel to and coplanar with one another, and are oriented substantially orthogonally with respect to the axis of propagation of said beam of radiation, said first and second photocells being symmetrically and substantially equally shadowed by said cylindrical object during each revolution of said cylindrical object to produce said first and second signals as time-varying signals of substantially equal amplitude and substantially identical phase as said object is rotated by said drive means.

3. The apparatus defined in claim 1 or 2 wherein said filter means comprises a low-pass electronic filter for attenuation of signal components arising from profile variations in said object.

4. The apparatus defined in claim 1 or 2 wherein said signal processing means of said circuit means includes a differential amplifier having an inverting input terminal connected for receiving said first signal supplied by said first detector, a noninverting input terminal connected for receiving said second signal supplied by said second detector and an output terminal connected for supplying a signal to said filter means.

5. The apparatus defined in claims 1 or 2 wherein said filter means is an electronically tuned filter circuit responsive to an applied filter control signal that establishes a cutoff frequency below which said filter means exhibits substantial signal attenuation and above which said filter means substantially passes an applied signal without attenuation, said apparatus further comprising speed sensor means connected for receiving said first and second electrical signals supplied by said first and second detectors, said speed sensor means including means for supplying a signal representative of said rate R at which said object rotates as said applied filter control signal.

6. The apparatus of claim 5 wherein said means for supplying said signal representative of said rate R includes second signal processing means connected for receiving said first and second electrical signals supplied by said first and second detectors, said second signal processing means including means for providing a time-varying signal having a frequency substantially equal to R.

7. The apparatus of claim 6 wherein said electronically tuned filter is responsive to said applied filter control signal to establish said cutoff frequency as a function of the magnitude of said applied filter control signal and wherein said means for supplying said signal representative of said rate R includes frequency conversion means connected for receiving said time-varying signal having a frequency substantially equal to R, said frequency conversion means including means for supplying said applied filter control signal as a signal having an amplitude substantially representative of said rate R.

8. The apparatus of clam 6 wherein second signal processing means is a signal summing circuit arrangement.

9. The apparatus of claim 8 wherein said electronically tuned filter is responsive to said applied fliter control signal to establish said cutoff frequency as a function of the magnitude of said applied filter control signal and wherein said means for supplying said signal representative of said rate R includes frequency conversion means connected for receiving said time-varying signal having a frequency substantially equal to R, said frequency conversion means including means for supplying said applied filter control signal as a signal having an amplitude substantially representative of said rate R.

10. The apparatus of claim 1 or 2 wherein said circuit means further includes a peak detector connected for receiving the signals supplied by said filter means and responsive thereto for supplying a signal representative of the runout of said object.

* * * * *